United States Patent [19]

Tkacs et al.

[11] Patent Number: 5,526,268
[45] Date of Patent: Jun. 11, 1996

[54] DYNAMIC LANGUAGE CHANGING PROCESS GRAPHICS

[75] Inventors: Dennis P. Tkacs, Greensburg; Jeffrey J. Grott, Irwin; Michael J. Gardner, McDonald, all of Pa.

[73] Assignee: Westinghouse Electric Corporation, Pittsburgh, Pa.

[21] Appl. No.: 241,143

[22] Filed: May 11, 1994

[51] Int. Cl.$^6$ .................................. G06F 19/00
[52] U.S. Cl. ................................ 364/419.16
[58] Field of Search ............... 364/419.16, 146, 364/147, 188, 189, 474.22, 474.24; 395/128, 148, 161

[56] References Cited

U.S. PATENT DOCUMENTS

| | | | |
|---|---|---|---|
| 4,202,041 | 5/1980 | Kaplow et al. | 364/900 |
| 4,803,039 | 2/1989 | Impink, Jr. et al. | 376/216 |
| 4,853,175 | 8/1989 | Book, Sr. | 376/216 |
| 4,908,775 | 3/1990 | Palusamy et al. | 364/508 |
| 5,009,833 | 4/1991 | Takeuchi et al. | 376/217 |
| 5,384,910 | 1/1995 | Torres | 395/156 |
| 5,408,603 | 4/1995 | Van de Lavoir et al. | 395/161 |
| 5,414,939 | 5/1995 | Waugaman | 33/522 |

*Primary Examiner*—Donald E. McElheny, Jr.
*Attorney, Agent, or Firm*—J. C. Spadacene

[57] ABSTRACT

An information display system for representing the condition of an industrial process is dynamically convertible via a control input from presenting information in a first form of output to one or more additional forms of output that are different but equivalent to the first. The system can thereby convert the presentation to display terms and labels in a second language or to use a different diagrammatic representation for process flow conditions and the like. The system has a processor with encoded definitions that may be data type groups or point groups, text groups, symbol groups and the like. A memory stores the different but equivalent definitions applicable to the two forms of output, preferably in one-for-one corresponding lists in memory. A control input such as a pointing device or touch sensitive screen triggers the processor to change from one set of definitions to another. The device is particularly applicable to changing between languages, but also can change graphics and similar elements of symbology, for example so that a troubleshooter who speaks only one language or a person familiar with one type of graphic display or set of units of measurement can quickly comprehend the status of a monitoring and control system that normally uses a different language or display, by dynamically converting to more familiar symbology.

17 Claims, 4 Drawing Sheets

DYNAMIC LANGUAGE CHANGING PROCESS GRAPHICS

BACKGROUND OF THE INVENTION

1. Field of the Invention

The invention relates to the field of process control systems having text and graphic indicators for representing process parameter values and the like. A data processor based information system that is variably programmable for indicating process control parameters graphically and textually, according to the invention stores a plurality of equivalent terms in different languages and/or equivalent graphic formats, and converts formatted process control display screens from one language or format to another under operator control via a touch screen, pointer mechanism or the like.

2. Prior Art

It is well known to display process control information graphically, using a variety of labels, lines, charts, graphs, colors and other text and display patterns to illustrate the flow of a process. Often, a graphical pattern reflects a physical layout of a process, with colors for grouping related process systems, the colors, patterns and/or text being changeable to reflect changes in parameter values. Various charts and graphs can be made available to the operators, for example via keystroke selections or by pointing mechanisms such as mice or touch screens.

Network coupled video data terminals are an apt means for presenting a combination text and graphic display of this type. Such devices are programmable to set up formats for graphic display, and can store appropriate messages or labels that control the character displays and graphics used to represent a particular condition of the monitored process. Blinking, color changes, changes to lines or figures and similar depictions can be used to point out occurrences that are detected by the control processor from sensed levels of process parameters or combinations of parameters as compared to stored thresholds. Textual information such as labels or displays of parameter values such as temperatures or pressures are thereby presented to the system operators in a convenient manner for showing critical information such as bottlenecks, equipment malfunctions or potentially dangerous trends, and also are useful more mundanely for generally determining the state of the process.

Such displays are not limited to process flow parameters and can be applied as well to maintenance functions such as usage monitoring. In any event, such process control systems are programmable with respect to precisely what graphic details and text will be used to present information representing a particular process condition. Insofar as the systems are programmable by the operator, it is also typical to provide a graphic user interface (or GUI) that assists the operator in encoding choices for how information will be displayed. Whether included in the graphic user interface to assist in programming or whether selected by the operator for display of process parameter data, the graphics and the text used are customized so as to be most understandable to the particular person to whom the information is to be displayed. Thus, the text and graphic information can be different for different systems, even though the underlying hardware and/or software operational system is the same.

Extensive process parameter displays are advantageous in connection with complex processes, for example to monitor all the interactive systems of an electrical power generation plant such as a pressurized nuclear reactor. "Expert" process control systems are known that are programmably arranged to permit a user to display information for various uses. Systems that model plant behavior as a part of their functions are disclosed, for example, in U.S. Pat. Nos. 5,009,833—Takeuchi et al.; 4,908,775—Palusamy et al.; 4,853,175—Book, Sr.; or 4,803,039—Impink, Jr. et al.

Versatile process monitoring systems allow the operators to set up or to select a variety of procedures or display modes, as considered appropriate in a particular process monitoring application. Interactive terminals with inputs and displays are provided whereby the operators can make the necessary selections and view the resulting information displays. Most such systems employ text as a part of the display for interactively presenting information to the operators in connection with set up functions and operational functions. For example, menus may include text for user selection of options, graphs, charts and lines may be labelled to permit the operators to interpret them. In general, more complicated or expert monitoring systems require more text than less complicated ones, to enable the operators to use the system.

The use of text information in interactive systems presents a language difficulty, particularly for persons who may attempt to troubleshoot an unfamiliar setup. When a supplier of a monitoring and control system provides a system for use in a particular country, the system is naturally supplied with or programmed for that country's local language, so that its outputs are comprehensible to the intended users. However, the troubleshooters may be unable to fully understand the setup or the messages and labels that are provided. Although graphic presentations are inherently better subject to understanding independently of language, the same comprehension problems that occur when one is unfamiliar with the language used, also occur if one is unfamiliar with a particular form of graphic presentation.

Conventional computer systems include alternative keyboard mappings that define specific character sets (fonts for display or printing) designed for different languages and selected as a software or firmware function. Thus, one can readily convert a computer hardware setup for use in any of several different languages by changing the keyboard mapping/font selection as a software function, for example by making the appropriate choice in the CMOS setup information of a DOS computer system. This does not convert the underlying data from one language to another. It simply changes the correspondence of individual text characters to the binary codes produced by a standard keyboard or the like and used to drive a display or printer. The keys of a standard keyboard are labelled for the desired language, and used normally, although the character set used has been changed. It is still necessary interactively to operate a data processing system programmed for a particular language in that language. Similarly, in certain Pacific Rim languages, the number of possible characters exceeds what is practical using a keyboard, and software provides an input method for interpreting a sequence of keystrokes to generate one character for display or printing.

It would be advantageous to provide a process monitoring system that is independent of language, and can be operated by persons who are fluent in only one of two or more alternative languages. Bilingual dictionary software is available, for example from Globalink, Inc. (Fairfax, Va.), that can convert terms from one language to another. However, applying a dictionary program to a process control and monitoring system carries a large overhead in memory storage (e.g., German/English requires 15 Megabytes). Processing time requirements may be inconsistent with the monitoring system's processing power. Automatic translation can be prohibitive if more than two languages are attempted. Although these dictionary programs are sensitive to details of grammar and syntax, they are unable to accurately translate certain idiomatic passages and are limited in vocabulary to the extent that they are only practically operable to save the time of a translator who is already moderately conversant in the two languages. It would be particularly advantageous in a process monitoring system if language conversions could be accomplished more directly.

As mentioned above, the problem of enabling operation in two or more symbologies applies to graphics displays in that an operator may be familiar with one form of graphic display and not another form that may be functionally equivalent and is more easily understood by some other operator. An operator of a monitoring or control system may have a preferred graphic manner of depicting certain occurrences, and a display format may be programmably arranged to use selected (i.e., programmed) particulars in graphics. Thus for example, one user may choose to depict a process flow logjam by blinking an area of a process flow line display, another may choose to show the line as broken, and a third may superimpose a barrier indicator. In the U.S.A., it is conventional to take advantage of users' familiarity with traffic signals such as stop lights. Thus, for example, movement or satisfactory conditions are typically shown as green, cautions as yellow and stoppages or critical conditions as red. These conventions may not be as familiar in other cultures. As another example, in the U.S.A. the color black is associated with death or mourning and may be appropriate to designate a stoppage or a machine that is down. In oriental cultures, white is conventionally associated with death or mourning. It would be advantageous if such graphical components were interactively selectable dynamically to permit instant changes between such conventions. A user could choose details of language and graphic formatting, without re-programming the system, as a means to help an operator or troubleshooter that is unfamiliar with a particular application of a monitoring/control system to understand the system quickly, by simply presenting text and graphics in the symbology with which that operator or troubleshooter is most familiar. Such a system would not interfere with operation of the underlying system because only details of the output need to vary to permit customization from operator to operator.

A further advantageous application of interactive conversion as described is the selection of units of measurement used to display numeric data. Metric/English conversions are an example. Another example may be to permit switching between units recommended by particular industry groups (e.g., ANSI vs. ASME, etc.). Whereas all such conversions would be advantageous to enable a user who is particularly conversant in one of the symbologies, which can be construed to include any of these aspects of data presentation, the problem remains in how to arrange for such conversions in the data processing system in a manner that provides the desired result of dynamic interactive selection among two or more equivalents, at a minimum of overhead in terms of memory requirements and processing time.

SUMMARY OF THE INVENTION

It is an object of the invention to provide a process monitoring and/or control system that allows a user to select any of a plurality of available symbologies, by making a simple interactive selection that does not require extensive programming or translation steps.

It is also an object of the invention to provide standardized conversion tables for at least one of text and graphic information, preferably by using an indexing arrangement having corresponding selections in the respective symbologies.

It is a further object to permit interactive selection of aspects other than text as symbological elements, including alternative graphic aspects such as lines, arcs, colors, symbols and similar features or alternative units of measure.

These and other objects are accomplished by an information display system for representing the condition of an industrial process, that according to the invention is dynamically convertible via a control input from presenting information in a first form of output symbology to one or more additional forms of output symbology that are different but equivalent to the first. The system can thereby convert the presentation to display terms and labels in a second language or to use a different diagrammatic representation for process flow conditions and the like. The system has a processor with encoded definitions that may be data type groups or point groups, text groups, and/or symbol groups. A memory stores the different but equivalent definitions applicable to the two forms of output, preferably in one-for-one corresponding lists. The display apparatus is set up to provide one or more display configurations wherein information is displayed at predetermined locations on a display screen. A control input such as a pointing device or touch sensitive screen triggers the processor to change from one set of definitions to another, thus converting all or part of the display to a new output symbology. The device is particularly applicable to changing between languages, but also can be made to change between graphic symbols, units of measure, and similarly alternative aspects of symbology, for example so that an English speaking troubleshooter or a person familiar with one set of symbological conventions can quickly comprehend the status of a monitoring and control system that normally uses a different language, symbol set, units of measure convention or the like, by dynamically converting to more familiar language and/or graphics and/or measurement units, etc.

For this purpose, an aspect of the invention is to provide a method of converting at least part of an information display from presentation of information according to a first form of output to at least one additional second form of output, wherein the first and second forms of output are different but equivalent. This is accomplished by providing an information display system having at least two alternative forms of output for at least part of the information display, programming the information display system to present the information according to the first form of output, said first form of output including a subset of choices for at least one of a distinct language, a distinct graphical depiction and a distinct set of units of measure for representing data points of said information. The second form of output is defined by storing a second subset of choices for said at least one of language, graphical depiction and set of units, the second subset being at least partly different than the first subset. The information display system then can be operated while monitoring a control input for choosing among the alternative forms of output, and switching from the first form of output to the second form of output upon detection of a command on the control input.

The switchover can be accomplished for all or part of the information display, according to type of data, type of text or symbol, selected area of the display, etc. To facilitate such groupings, the data points are cross referenced to point groups encompassing a plurality of related data points.

Related text groups are cross referenced as a collection of related text strings (e.g., equivalent terms in different languages). Related symbol groups can also be cross referenced as a collection of related (e.g., equivalent) graphic symbol definitions, such as alternatively selectable bitmaps of a predetermined segment of a display screen. Cross referencing of the text groups can include numeric conversions, for example as needed to convert between the use of different units of measure (e.g., English vs. metric). The at least two alternative forms of output comprise specifications of at least one of said graphics, text and units of measurement that apply to a plurality of data points in the point groups. The alternative definitions can be stored in aligned locations in lists or the like, so that the change from one alternative to another simply involves a change in the list used. Numeric conversions can be stored as alternative scaling and offset factors selected in this manner, or alternative subroutines can be chosen by conditional jumps that are variable via the definitions selected by the user.

According to another aspect of the invention, an apparatus for monitoring a process is provided with a digital processor, a control input, means for sensing and encoding values of process parameters, and a display device, each coupled to the processor, the processor being operable to present on the display device a diagrammatic display including text and graphics for simulating a condition of the process. A memory coupled to the processor is operable to store definitions of the text and graphics included in the diagrammatic display during predetermined process conditions, the processor formatting the diagrammatic display at least partly as a function of the definitions. The memory also stores alternative definitions of at least a portion of the text and the graphics, and the processor is responsive to the control input for switching between the alternative definitions for dynamically converting at least a subset of the diagrammatic display from one format to another format during operation of the apparatus for monitoring the process.

The dynamic conversion can be accomplished for all or part of the display, the parts to be converted being grouped, for example, into categories according to data point groups, text groups, symbol groups, measurement unit conventions, and the like. Alternatively, conversion can be accomplished for a selected area of the display. The processor is responsive to the control input for changing from said one format to said another format for selected ones of the categories by addressing techniques. In this manner, a language or formatting change can be accomplished quickly and accurately, with very minimal processing and memory resources being devoted to translation.

BRIEF DESCRIPTION OF THE DRAWINGS

There are shown in the drawings certain exemplary embodiments of the invention as presently preferred. It should be understood that the invention is not limited to the embodiments disclosed as examples and is capable of variation within the scope of the appended claims. In the drawings.

DETAILED DESCRIPTION OF THE PREFERRED EMBODIMENTS

Figure 1:
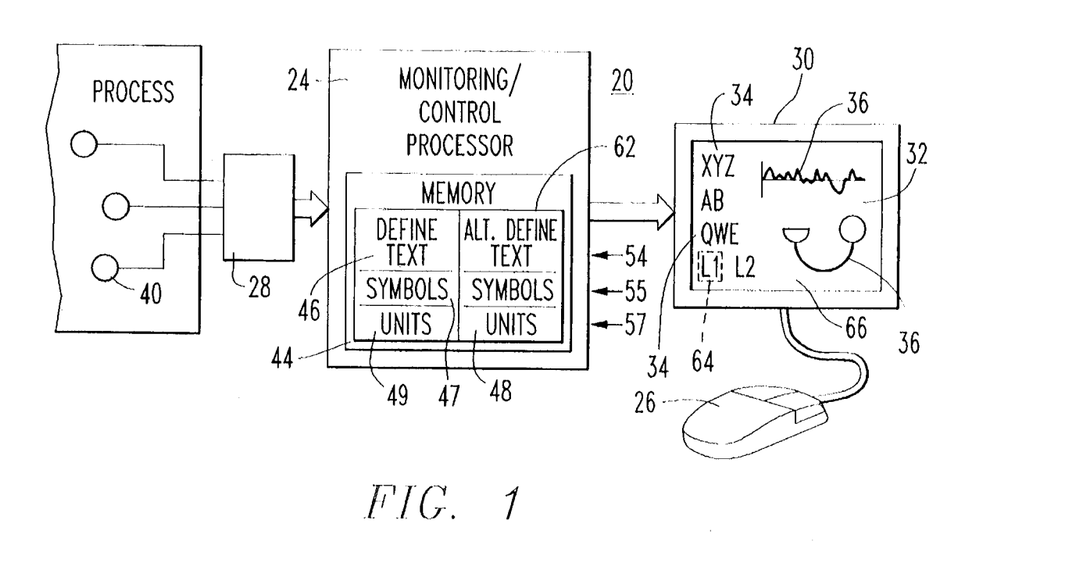
FIG. 1 is a schematic block diagram showing a process monitoring apparatus according to the invention.

FIG. 1 generally illustrates an apparatus 20 according to the invention for monitoring a process. The invention is applicable to various types of processes, but can be considered in connection with an exemplary process such as an electric power generation plant. A digital processor 24 is coupled to a control input 26, means 28 for sensing and encoding values of process parameters, and a display device 30 capable of variable presentations. Processor 24 is operable to present on the display device 30 a diagrammatic display 32 including text 34 and graphics 36 for simulating a condition of the process. Various sensors 40 provide analog or digital data to processor 24 via suitable interfaces (not shown) that enable processor 24 to encode the present value of process parameters, to log variations in the values over time, and otherwise to monitor the process in known manner. Processor 24 is programmed to drive the display device 30 in order to produce visual presentations that can include graphics 36 such as lines, symbols, colors, motion and other particulars intended to simulate activity (or lack of activity) in the process, either quantitatively or qualitatively. Additionally, various text labels 34 can be provided and actual measurements or summaries of measurements (e.g., averages) can appear in display 32 together with text 34 that explains them, for example naming the measured parameter and providing an indication of the units of measure used to arrive at the displayed numerical data.

Processor 24 is coupled to a memory 44 in which data is stored defining the text and graphics included in the diagrammatic display 32 during predetermined process conditions. Memory 44 also stores collected process data information, and can be arranged as well to store conversion factors and/or subroutines defining means for converting process data into plots or tables according to a convention for units of measure. Processor 24 formats diagrammatic display 32 at least partly as a function of the stored definitions 46, for example the text portions of the display are stored in the processor memory 44 and when displaying the related data, processor 24 locates the associated text and positions the text in the required pan of display 32. Similarly, the graphic lines, colors and the like are embodied in the processor's programming, preferably at least partly defined by stored data such that the text and graphics represent an overall display symbology.

For purposes of this disclosure, the following definitions are helpful in understanding the invention:

"Point" refers to a database record containing a value (such as a temperature reading), and may contain related data (such as a corresponding reading, for example the time of day of the reading);

"Process Diagram" refers to a graphic depiction of a plant process (or other data), typically displayed on a CRT. A process diagram, for example, can display the values of points next to an associated graphic symbol;

"Point Group" or "Data Point Group" refers to a related group of points. When a diagram is loaded (i.e., displayed), a Point Group can be specified such that the same symbol is used for each occurrence of the same type of item (e.g., equivalent pieces of machinery) by changing the displayed point group;

"Text Group" similarly refers to a group of related text. When a diagram is loaded (displayed), a Text Group may be specified, enabling change from one language to another by selection of the Text Group;

"Symbol Group" refers to related symbols in the same manner;

"Units of Measure" refer to different scale and offset factors applied to a given measurement, e.g. , for changing between display in english vs. metric units;

A "Selection" is made by user action to identify a change in a selection made. A selection can be made by identifying an area of a diagram using a touch screen or peripheral pointer such as a mouse or light pen, and selecting a change in 'selection for that area. Alternatively, a change in selection can be made for all the members of a group;

"Symbology" refers to all the aspects by which information is presented to users, such as the particular choices of language, characters, graphic symbols, units of measure and the like, from a larger set of possible choices.

The monitoring apparatus 20 may be more or less complicated. For example, apparatus 20 can include feedback control outputs coupled to process actuators (not shown) or can simply monitor and report. In addition to display of process parameters, the system can include maintenance or engineering functions, such as usage monitoring, trend analysis functions or the like, upon which the system can report to the user via a suitably formatted display. In addition to displaying measured values, the system could be arranged to run simulations for assessing the likely result of various changes in operation.

The invention is applicable to all these variations, but is especially useful where the text and/or graphic displays, at least in some operational modes, are relatively complex. For a complex graphic display, or for a display that includes a large amount of explanatory text, it may be difficult or impossible for an operator who is not very familiar with the display to comprehend all the information it contains. For example, if the monitoring apparatus is arranged to display text in the Japanese language, using metric units of measure and graphic details that are conventionally employed in Japan, it may be difficult for a troubleshooting engineer who speaks only English and is familiar with English units of measure and graphics that may be conventional in the U.S.A. but not in Japan, to fully comprehend the information.

According to the invention, the storage and selection of the definitions used to control the nature of text, graphics, units of measure, and similar distinct attributes of symbology, to enable a quick conversion from one symbology to another, by causing processor 24 to refer to different definition sets that are chosen under user control.

The invention also enable one diagram to be used as a template to present information on redundant pieces of equipment. For example, four boilers can be represented with the same set of graphics, but with different data point groups. The text and symbols displayed for each boiler may be changed via the text and symbol group mechanism.

For this purpose, the memory 44 coupled to the processor is further operable to store alternative definitions 48 applicable to at least a portion of the same text, graphics points and measurement unit conventions that the foregoing definitions 46 would display in a different manner. Processor 24 is responsive to the control input 26 for switching between the alternative definitions 46, 48 for dynamically convening at least a subset of diagrammatic display 32 from one format to another format during operation of the apparatus 20 for monitoring the process. Preferably, the alternative definitions 48 include alternative text in at least two distinct languages such as English and Japanese. English and German, Japanese and German, etc. More than two languages can be provided to permit a greater range of selection, and a default language preferably is chosen in the absence of an alternative selection. The processor's operations including collecting and displaying information are substantially independent of the language used, except that the capability of changing dynamically between languages adds slightly to the memory necessary for storing definitions because equivalent definitions for each of the available languages are provided, and minimal processing steps are needed to adjust the definition addressing technique used, namely to point to the new definitions.

In one embodiment, changing from one symbology to another is simply a change in memory addressing to cause the processor to select data from the appropriate sequence or list for display of a particular text string, graphic symbol or the like, the alternative lists in each case being applicable to the same number of letter strings or graphic pixels such that one alternative fits in place of another. In that case changing symbologies affects only the format of the generated display or output and can be effected by a simple software function. In an alternative embodiment, the processing of process data can change as a function of the symbology selected. In that case, units of measure or other non-textual characteristics of graphics can be altered due to the symbology selected. For example, where the change involves the selection of different units of measure, the change can also vary the positioning of symbols on the display (e.g., the location of measurement units on a plot can be varied so that the plot is labelled in even units), or as another alternative, process data can be treated according to different specifics for generating the displayed data (e.g., selecting different scaling and offset factors or varying truncation or rounding-off procedures).

The definitions 46 and the alternative definitions 48 in the respective languages preferably correspond one for one, and are accessibly stored in memory 44. Thus processor 24 can switch from one format to another format simply by altering the list accessed in memory 44 to choose a different corresponding set of definitions, i.e., translations of the terms, graphics and/or units used. In the embodiment shown, the definitions (and alternates) include not only language definitions, but also symbol definitions 47, and optionally unit-of-measure definitions 49.

The operator may wish to convert the entire display 32 to a chosen set of definitions. However, especially for troubleshooting purposes it is helpful to enable only a portion of the display to be converted, and thereby to look more closely at some attribute of the display. For example, even if a person prefers one form of graphics, he or she may choose to convert only the text in order to better understand a question regarding the presentation as displayed in the other form of graphics.

According to one alternative, the definitions can be distinctly grouped into categories according to at least one of data point groups 52, text groups 54, symbol groups 55 and/or measurement unit groups 57. Processor 24 can then be responsive to control input 26 for changing from said one format to said other format for the selected category or categories. As another alternative, the user can select areas of the diagrammatic display 32, e.g., drawing a box around a selected area using control input 26, in which event processor 24 can convert to the alternative symbology in the selected area(s), leaving the remainder of the display configured as before.

Figure 2:
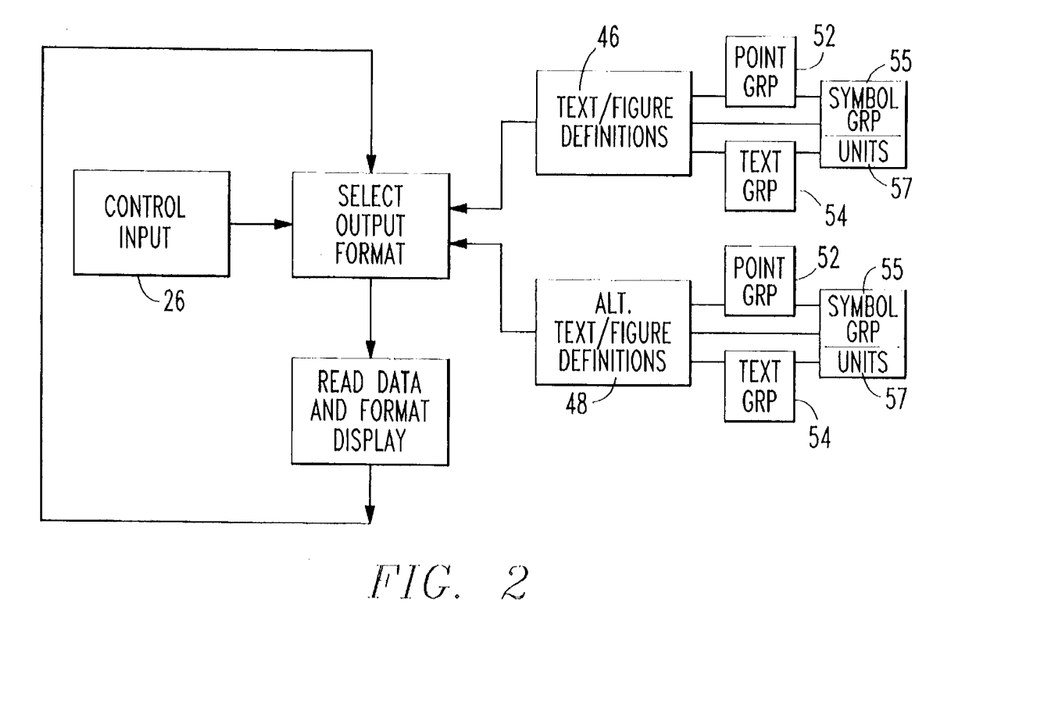
FIG. 2 is a block diagram illustrating the method according to the invention.

According to an aspect of the invention and as shown in FIG. 2, a method is provided to convert at least part of information display 32 from a presentation of information according to a first form of output to at least one additional second form of output, wherein the first and second forms of output are different but equivalent. The information display system 20 is provided with the capability to switch between at least two alternative forms of output for at least part of the information display. The information display system is programmed to present the information according to a first form of output, which form can be a particular choice of a subset of available choices. The choices are made for at least one of a distinct language, a distinct graphical depiction and a distinct set of units of measure for representing data points of the information. The second form of output is defined by storing a second subset of choices for said at least one of language, graphical depiction and set of units. The second subset is at least partly different than the first subset, but insofar as the subsets are different, they are alternative ways to present the same information and can be termed translations of one another.

The information display system 20 is operated while monitoring control input 26 to processor 24, for choosing among the alternative forms of output, preferably via a manual input means. As a function of the control input signal(s), processor 24 switches from the first form of output to the second form of output upon detection of a command on control input 26. In this manner the information display is dynamically switched between or among the at least two alternative forms of output.

The information advantageously includes a representation of process measurements including a plurality of data points and the information as displayed includes graphics 36, text 34 and measurement units 37. Thus the alternative forms of output can include at least alternative forms of the text in different languages, and preferably also alternative forms of graphics (e.g., different lines, colors, symbols and the like) and different numerical presentations. The data points are cross referenced to point groups 52 encompassing a plurality of related data points. The at least two alternative forms of output comprise specifications of at least one of said graphics 36, text 34 and units 37, that apply to a plurality of data points in the point groups 52 and/or a plurality of data points in text groups 54.

The subset of choices and the additional subset of choices (at least two and potentially more being provided) include members in one-for-one correspondence with one another. Advantageously, the choices are encoded by data stored in addressable list registers 62. By providing the choices that correspond in the same order for each list, switching from the first form of output to the second form of output is accomplished simply by altering addressing of the memory to point to a selected one of the subset and the additional subset and discontinue use of the other, for the whole display, for only text, data or symbol groups, or units of measure, or for a selected limited portion of the information display at which the processor effects switching from the first form of output to the second form of output.

Where the conversion effects a change in units of measure, it is of course necessary to adjust the scale and offset of the numerical data displayed as well as the label applied to describe the measurement. For process variable measurements encoded via analog to digital conversion, a scale factor and an offset factor typically are used to convert A/D converter output values (expressed for example as a number between zero and a full scale value at the A/D input), to a number of units of a physical measurement (e.g., of mass, speed, temperature, pressure, etc.). One alternative for converting between units is to change the scale factors to change the offset and scaling factors to reflect new units. A simultaneous change of both the numerical data and the label thus can be embodied in the definitions by including scale and offset factors for each of the alternatives, as well as different label information.

Preferably, a change in graphical depiction does not affect the area used for labelling, symbol display and the like, whereby each alternative occupies the same real estate on the display. It is also possible to define not only the text data (part of a text group), but also the position of its presentation on the display (part of a graphic point group), provided the alternatives do not conflict by overwriting and thus concealing portions of one another.

The invention provides a convenient method for converting a first language description of a process diagram displayed on a computer display to a second language, for example to accommodate "English-only" speakers. By generating the process diagram on the computer display for simulating a predetermined process system, including presentations of at least one of text, graphics and units of measure according to the first language, then encoding and storing additional presentations for at least part of the text, graphics and units of measure, according to the at least one second language (the additional presentations being different but equivalent to the presentations according to the first language), and operating a control input for initiating a conversion to the second language, the display apparatus 20 is conveniently converted with very little change in processing and memory requirements. The processor 24 simply reads the stored additional presentations and generates the process diagram on the computer display 30 for simulating the predetermined process system according to the second language.

The control input can be a keyboard or other switch means, but advantageously comprises at least one of a pointing mechanism 64 such as a mouse or a touch screen display. A pointer or touch screen enables the user to point out the portion or area to be translated and permits selections from menu items such as available optional choices.

Figure 3:
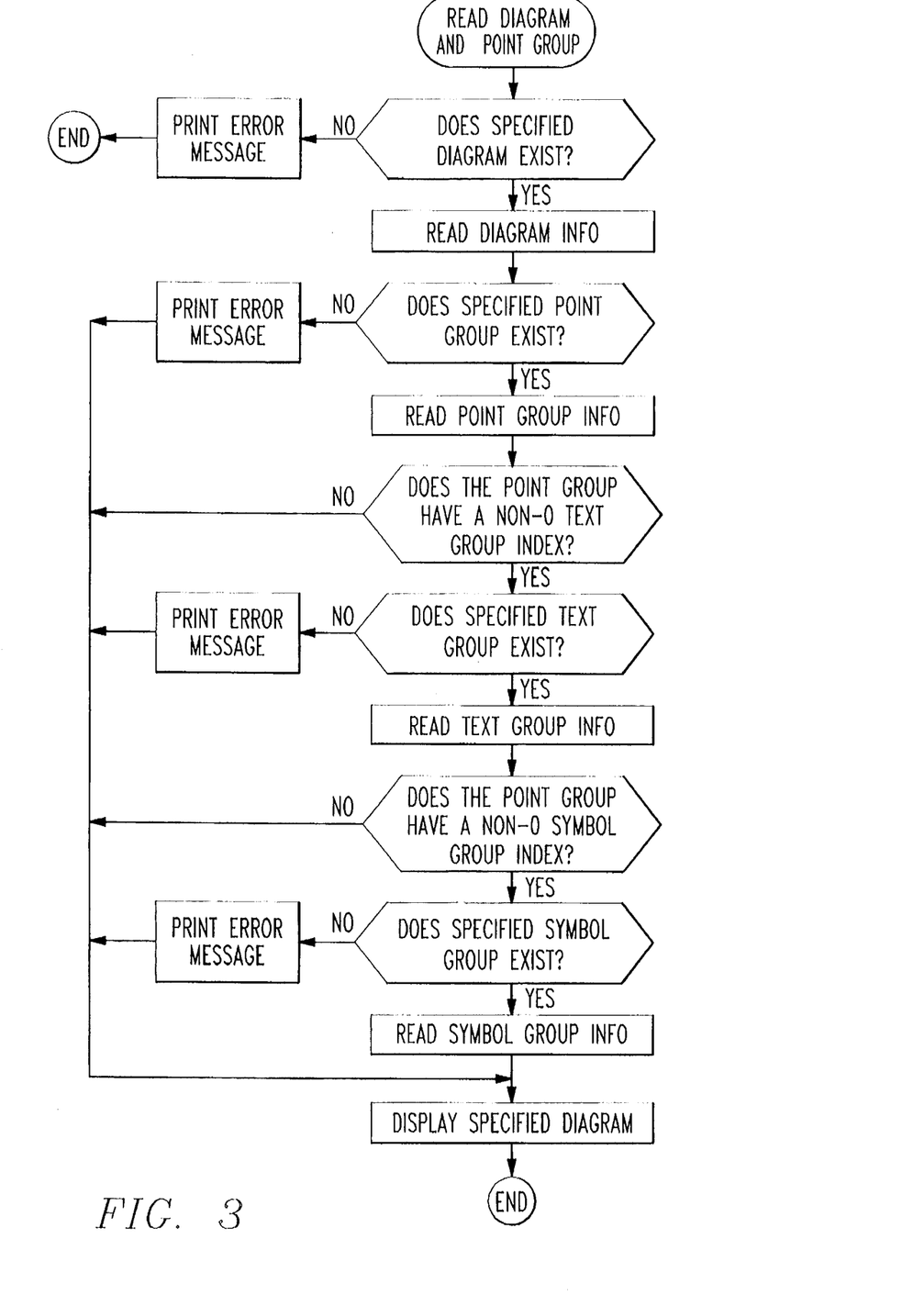
FIG. 3 is a flow diagram following the steps of effecting a conversion of text and/or point group format according to a preferred embodiment.

FIG. 3 illustrates a subroutine arranged to determine in connection with the change of a data point group to check for and change to a new text group as well. In a preferred embodiment, the invention is applied to process monitoring systems such as power generation plants. The data points in that connection are database records containing a value, which may be temperature or pressure readings or the like, averages, trend data and other data of this nature. This information is to be presented graphically, for human monitoring of a plant process or similar data. An appropriate display 30 is a CRT. The process diagram 32, for example, includes some representation of the value of certain data points associated with some graphic symbol intended to represent the process.

By categorization of related data points into point groups, not only is it possible to translate a group of related points at once, but some information may be common to all the data points in a point group. Categorization permits a single graphic symbol (for example representing a pump) to be displayed for all the data points in the corresponding point group. Similarly, text can fall into categorized text groups. Thus when a diagram is displayed, a text group can be specified such that a same graphic can be used to display text in different languages by changing the text group. These selections preferably are accomplished by the user selecting a desired item or area using a pointer device or the like, and making a new selection for a point group or text group.

The invention is applicable to systems that employ an operating system capable of drawing graphic symbols (e.g., lines, arcs, colors and the like) selected from a library of symbols, and capable of supplying data point information, numerically or graphically (by adjustment of the symbols) or in a tabular fashion, and typically employing labels. When a diagram is displayed, a point group is specified (either a default point group or a "translated" point group). The point group may comprise a list of offsets for points, within the point group. The same applies to text groups, as shown in Table I, below. With reference to FIG. 3, by selection of the related point group and text group, which preferably is cross referenced to the point group as shown in Table I. The process monitoring display can be varied as needed.

The foregoing selections can be embodied in revisions to the graphics libraries and graphic or symbol assembly routines of various data processing systems that convert programmed user selections into displays. The system need only be revised to permit variations in the graphic and text definitions used, preferably using offset storage of text, numeric factors and/or graphics in point and text group lists, symbol group lists and factor lists representing alternative units of measure, whereby the selection of one or another set of different but equivalent display details is accomplished by modifying the location at which the processor looks for definition of these details.

Figure 4:
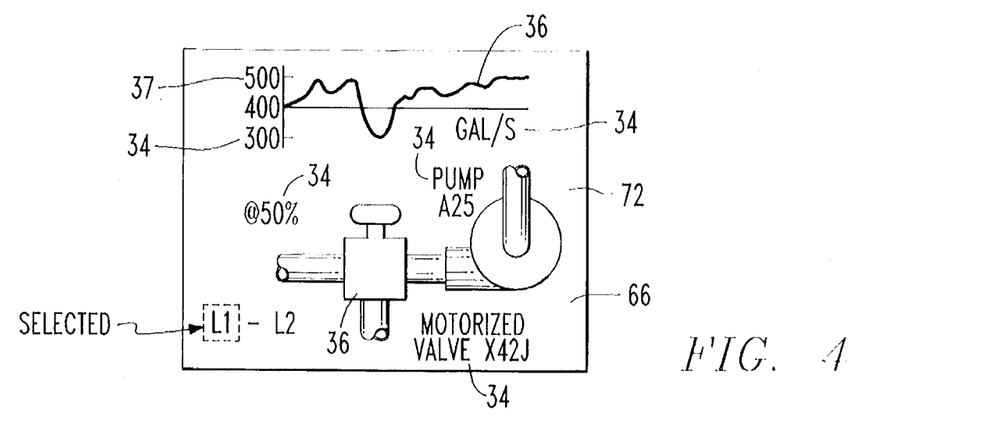
FIG. 4 illustrates an exemplary display according to one form of output.
Figure 5:
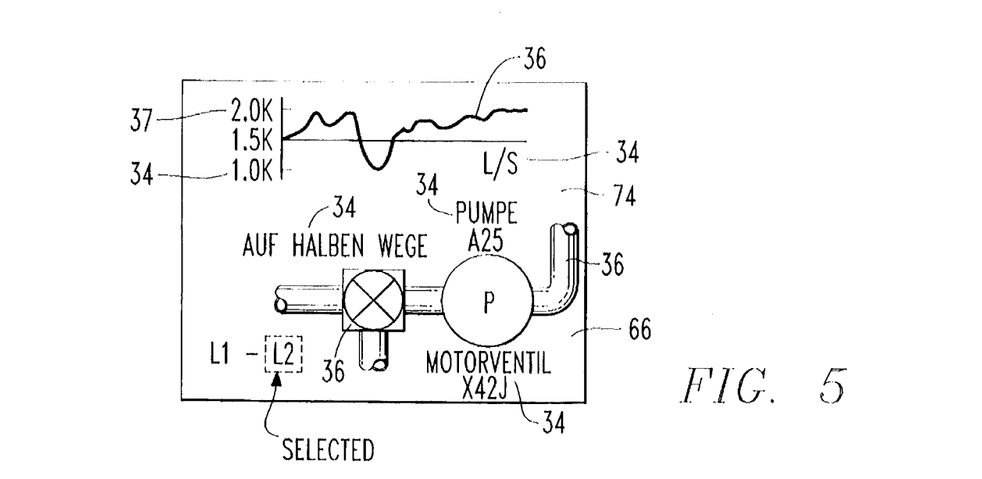
FIG. 5 illustrates a display of the same functional information as FIG. 4, but in a different but equivalent form of output; and, FIG. 6 illustrates a preferred embodiment wherein the data or text points are grouped to permit conversion of text or format for a selected subset of displayed items.
Figure 6:
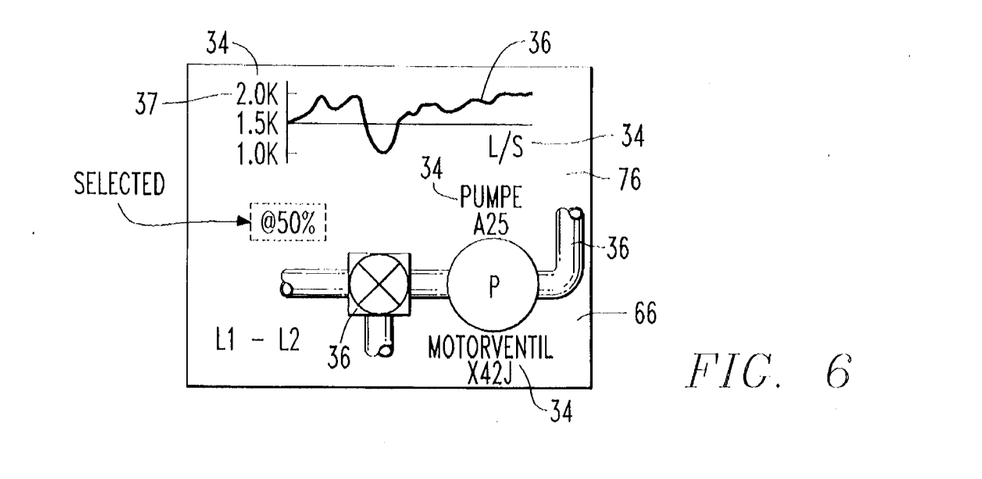

FIGS. 4 through 6 show the result of display translation according to the invention. In FIG. 4, one form of output 72 is provided, having particular graphic and text presentations that, for example, illustrate a section of a coolant flow path. In FIG. 5, the same functional information is displayed as in FIG. 4, but in a different but equivalent form of output 74. Finally, FIG. 6 illustrates a preferred embodiment wherein the data or text points are grouped to permit conversion of text or format for a selected subset of displayed items. In this case, all the data points that fall into a group that can be designated valves have been translated to form a partially translated output 76. Other variations are possible and should now be apparent.

Figure 7:
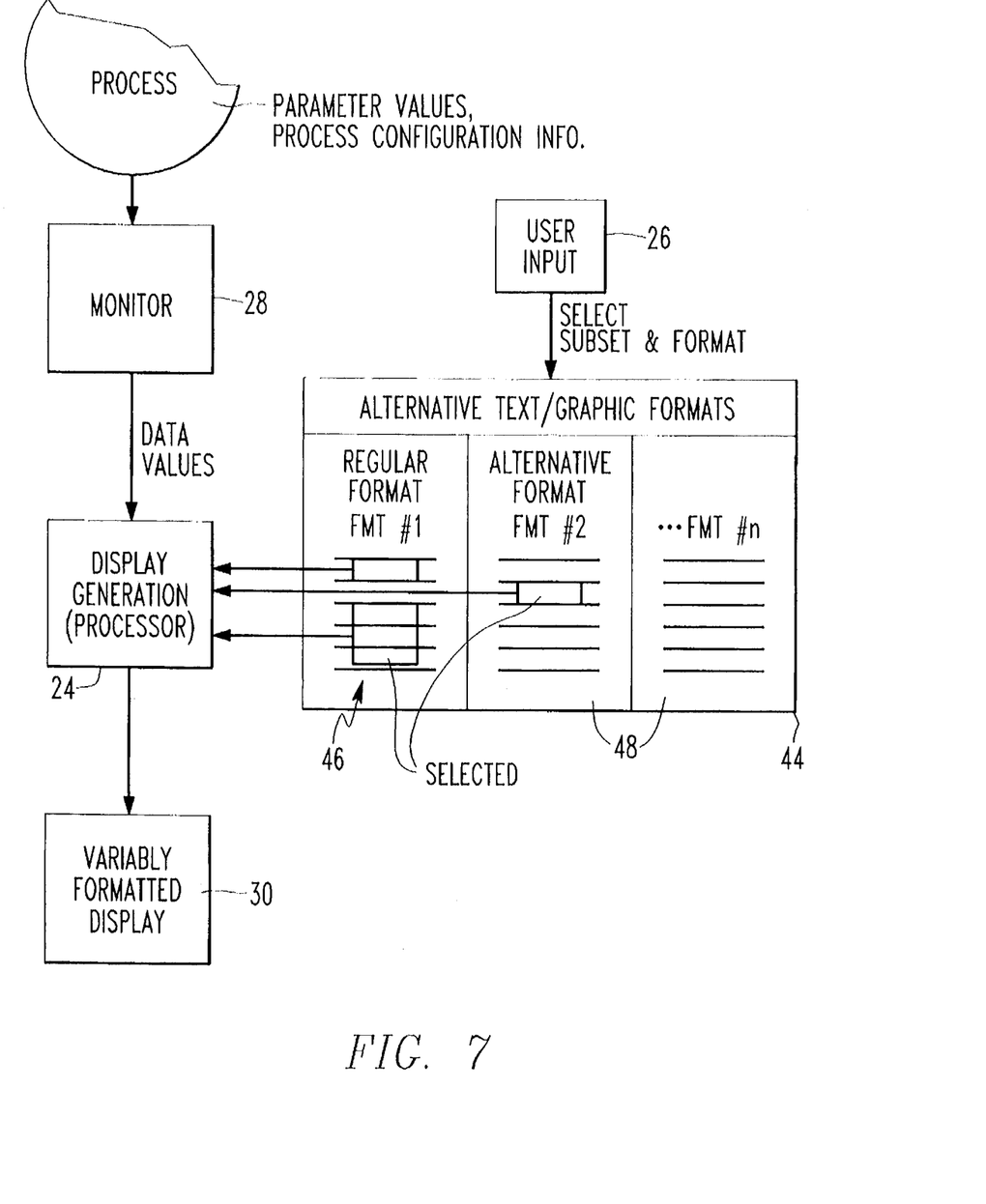
FIG. 7 is a flow diagram illustrating generation of a variably formatted display by user selection among alternative formats for a selected subset of display data.

FIG. 7 is a flow diagram that shows the foregoing operations and relationships graphically, wherein process monitor 28 feeds data values to processor 24. Processor 24 formats the presentation of the data on display 30 by using those portions of the alternative text/graphic display formatting in memory 44 that are selected from the first format memory store 46 or the alternative format(s) 48, these selections being made via user input 26 as the user selects among the subset of data to be affected, and the chosen format therefor.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

TABLE I

| | Data Structures | |
|---|---|---|
| Point Group Structure | Text Group Structure | Symbol Group Structure |
| <number of points = n> | <number of strings (text group 1) = m1> | <number of symbols (symbol group 1) = w1> |
| <point name 1> | <text 1> | <symbol def 1> |
| <point name 2> | <text 2> | <symbol def 2> |
| . | . | . |
| . | . | . |
| . | . | . |
| <point name n> | <text m1> | <symbol def w1> |
| <Text Group number> | <number of strings (text group 2) = m2> | <number of symbols (symbol group 2) = v2> |
| | <text 1> | <symbol def 1> |
| . | | |
| . | | |
| <Symbol Group number> | <text 2> | <symbol def 2> |
| . | . | . |
| . | . | . |
| . | . | . |
| | <text m2> | <symbol def v2> |
| | . | . |
| | . | . |
| | . | . |
| | <number of strings (text group X) = mX> | <number of symbols (symbol group Y) = mY> |
| | <text 1> | <symbol def 1> |
| | <text 2> | <symbol def 2> |
| | . | . |
| | . | . |
| | <text mX> | <symbol def mY> |

We claim:

1. A method for adapting a selectable part of a process control information display normally operative for presentation of process information according to a first form of output, to suit users preferring at least one additional second form of output, wherein the first and second forms of output are different but equivalent, comprising the steps of:

programming an information display system to present the information according to the first form of output, said first form of output including formatted text and graphics having at least one of: a distinct language, a distinct graphical depiction and a distinct set of units of measure, representing data points of said information including parameter values and process configuration information respecting a process;

defining distinct alternative formatted choices according to the second form of output for at least a subset of said information including at least one of text and graphics according to the first form, and storing the second form for the subset, the subset in the second form being different than the first form in at least one of: language, graphical depiction and units of measure, but representing the same said parameter values and process configuration information, according to the second form;

operating the information display system normally to display the parameter values and process configuration information according to the first form;

monitoring a user operated control input for selecting particular parts of the parameter values and process configuration information to thereby define at least a subset of selected particular parts;

switching the information display for said selected particular parts from the first form of output to the second form of output upon detection of a command on the control input, while continuing to operate the process control information display.

2. The method of claim 1, wherein the information comprises a representation of process measurements including a plurality of data points and the information display includes graphics and text, the alternative forms of output including at least alternative forms of the text in different languages.

3. The method of claim 2, wherein the data points are cross referenced to point groups encompassing a plurality of related data points, and wherein the at least two alternative forms of output comprise specifications of at least one of said graphics and said text, that apply to a plurality of data points in the point groups.

4. The method of claim 2, wherein the data points are cross referenced to text groups encompassing a plurality of related data points, and wherein the at least two alternative forms of output comprise text applicable to a plurality of data points in the text groups.

5. The method according to claim 1, comprising storing the subset of choices and the additional subset of choices in one-for-one correspondence in addressable lists in memory, and wherein said switching from the first form of output to the second form of output is accomplished by selecting a different one of the lists.

6. The method according to claim 1, wherein the data points are cross referenced to point groups encompassing a plurality of related data points, and wherein the at least two alternative forms of output are determined by specifications of at least one of said graphics and said text, that apply to a plurality of data points in the point groups, and further comprising selecting a subset of the point groups and switching from the first form of output to the second form of output for said subset only.

7. A method for selectively converting a process diagram displayed on a computer display including text labels in a first language to at least one second language during operation of the computer display, comprising the steps of:

generating the process diagram on the computer display for simulating a predetermined process system, the process diagram including presentations of at least one of text, graphics and units of measure according to the first language, the process diagram, as generated, representing process parameter value and process configuration information reflecting a process;

encoding and storing definitions of additional presentations for at least part of at least one of the text, graphics and units of measure, according to the at least one second language, the additional presentations being different than the presentations according to the first language, but representing the same said process parameter value and process configuration information;

operating a control input for initiating a conversion to the second language;

reading the definitions of the additional presentations; and, generating the process diagram on the computer display for simulating the predetermined process system according to the second language for at least part of the process diagram reflecting the process, whereby display of the same said information is at least partly convertible by user control during operation of the computer display.

8. The method of claim 7, wherein the process diagram simulates the process system by display of data points that are cross referenced into at least one of point groups and text groups encompassing a plurality of related data points, and further comprising generating said process diagram according to the second language for data points in selected ones of the point and text groups.

9. The method of claim 7, further comprising defining and storing a first subset of choices and at least one additional subset of choices, that encode corresponding definitions of the at least one of text, graphics and units of measure, and wherein said reading and said generating in the second language comprise selectively changing between the first subset and the at least one additional subset.

10. The method of claim 9, wherein corresponding members of the first subset and the at least one additional subset are stored in one-for-one correspondence in addressable lists in memory, and wherein said conversion to the second language comprises switching between the first and additional subsets by altering selection of the lists.

11. The method of claim 10, further comprising selecting a portion of the process diagram and switching from the first subset to the additional subset for said portion only.

12. The method of claim 7, wherein the control input comprises at least one of a pointing mechanism and a touch screen display.

13. An apparatus for monitoring a process, comprising:

a digital processor coupled to an industrial process via means for encoding values of process parameters and process configuration information, the processor being programmed to control a display device and to present on the display device a diagrammatic display including text and graphics for simulating a condition of the process;

a memory coupled to the processor, containing programmed definitions of the text and graphics included in the diagrammatic display during predetermined process conditions, the processor normally formatting the diagrammatic display at least partly as a function of said definitions, the memory further containing alternative definitions of at least a portion of at least a subset of one of the text and the graphics, the alternative definitions being different than the programmed definitions but representing the same said condition of the process;

a user operated control input coupled to the processor and operable with the processor to select at least a subset of the information on the diagrammatic display, the processor switching between the alternative definitions and thereby converting the subset of the diagrammatic display from one format to another format during operation of the apparatus for monitoring the process.

14. The apparatus of claim 13, wherein the alternative definitions include alternative text in at least two distinct languages.

15. The apparatus of claim 13, wherein the alternative definitions include alternative graphical presentations representing the condition of the process.

16. The apparatus of claim 13, wherein the definitions and the alternative definitions correspond one for one, and are addressably stored in the memory, and wherein the processor is operable to switch from said one format to said another format by altering selections from the memory.

17. The apparatus of claim 13, wherein the definitions are distinctly grouped into categories according to at least one of data point groups, text groups, symbol groups and areas of the diagrammatic display, and wherein the processor is responsive to the control input for changing from said one format to said another format for selected ones of the categories.

* * * * *